United States Patent [19]

Donelson et al.

[11] 3,765,623
[45] Oct. 16, 1973

[54] AIR INLET
[75] Inventors: John E. Donelson, Huntington Beach; William M. Douglas, Palos Verdes, both of Calif.
[73] Assignee: McDonnell Douglas Corporation, Santa Monica, Calif.
[22] Filed: Oct. 4, 1971
[21] Appl. No.: 186,049

[52] U.S. Cl. .................. 244/53 B, 60/269, 137/15.1
[51] Int. Cl. ............................................ B64d 33/02
[58] Field of Search .......................... 60/39.29, 269; 137/15.1, 15.2; 244/53 B

[56] References Cited
UNITED STATES PATENTS
3,583,661  6/1971  Stake ................................. 244/53 B
3,033,491  5/1962  Clark ................................. 244/53 B OTHER PUBLICATIONS
Space/Aeronautics, "Inlets for Supersonic Aircraft," May 1967, pp. 91–100

Primary Examiner—Milton Buchler
Assistant Examiner—Stephen G. Kunin
Attorney—Walter J. Jason et al.

[57] ABSTRACT

A generally circular air inlet for a pylon mounted aircraft jet engine wherein predetermined minimum lip thickness ratios are distributed around the inlet periphery in order to minimize the flow distortion caused by flow separation during certain design operating conditions.

10 Claims, 13 Drawing Figures

AIR INLET

BACKGROUND OF THE INVENTION

The internal lip of a jet engine air inlet is preferably constructed to direct air flow into the associated engine without producing pressure losses or flow distortion. Certain flight conditions, such as when the aircraft is at low speed during takeoff, particularly when a crosswind is present and/or at a high angle of attack, demand that the lip have a minimum thickness to prevent flow separation. With ample lip thickness, separation is avoided. However, thickening of the lip increases the size of the nacelle external geometry since a minimum inlet throat area must be maintained. The increased size can cause an undesirable increase in weight and drag during cruise flight.

The typical, generally circular air inlet for turbo-jet or turbo-fan powered subsonic aircraft has a uniform internal lip thickness. When the requirement for efficient cruise flight limits the lip thickness as is usually the case for high speed subsonic jet transports, the normal solution has been to provide means to vary the geometry of the air inlet for use during adverse operating conditions. This is disadvantageous, however, because the variable inlet geometry means cause increases in the complexity and weight of air inlets thereby generating performance, maintenance and reliability problems. Also, such variable geometry inlets make noise suppression more difficult due to their generation of wakes into the engine.

SUMMARY OF THE INVENTION

The present invention relates to generally circular air inlets for pylon or fin mounted jet engines. Each inlet has distributed lip thickness ratios about the periphery thereof in order to minimize the flow distortion caused by flow separation without substantially increasing external nacelle thickness with its attendant weight and drag penalties. The inlet can be of a fixed geometry design for a particular aircraft configuration and the lip thickness ratio is increased above the minimum value required for static operation only where flow separation is most likely to occur. In general, the lip is thickened on the bottom for operations at high angles of attack; on the sides for operation in yaw, side slip or for ground static operations where a crosswind is present; and in areas where the presence of other bodies such as wings and fuselages contribute to higher local velocities than if the inlet was isolated. By increasing the lip thickness ratio in the areas where separation is most likely to occur, adverse pressure gradients caused by flow separation and weight and drag penalties are substantially avoided. Also, by providing an air inlet with a fixed geometry, the problems confronting acoustic engineers in quieting the operation of modern day jet engines is greatly reduced.

It is therefore an object of the present invention to provide an air inlet wherein the thickness of the inlet lip around the periphery of the inlet is no greater at any point than is required by the operating limitations of the aircraft on which the inlet is installed.

Another object is to provide an air inlet which reduces noise pollution of the environment.

Another object is to provide an efficient air inlet needing no variable geometry so the air inlet is reliable and easy to maintain.

Another object is to provide a minimum drag air inlet which smoothly ducts air to a jet engine during adverse conditions so the operation and/or structural integrity of the engine is not endangered.

These and other objects and advantages of the present invention will become apparent after considering the following detailed specification which covers illustrative embodiments thereof in conjunction with the accompanying drawings wherein:

DESCRIPTION OF THE PRESENT EMBODIMENTS

Figure 1:
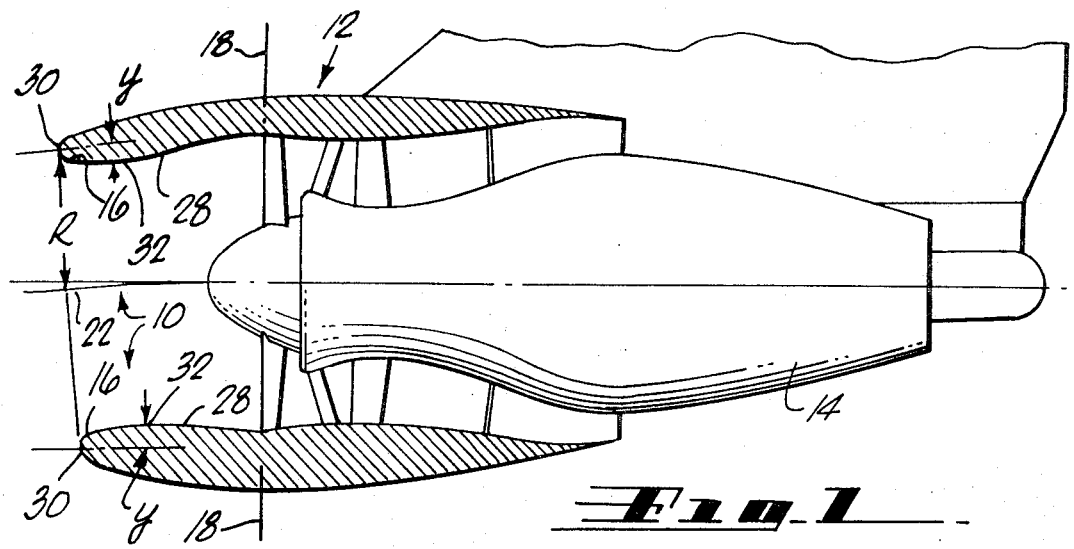
FIG. 1 is a simplified cross-sectional view of a generally circular air inlet constructed according to the present invention in place adjacent a turbo-fan jet engine.

Referring to the drawings more particularly by reference numbers, number 10 in FIG. 1 refers to an air inlet constructed according to the present invention. The air inlet 10 is formed in a nacelle 12 positioned to conduct air to a turbo-fan jet engine 14. The purpose of the engine air inlet 10 is to deliver high total pressure, high quality air to the engine face 18 under all operating conditions.

Figure 2:
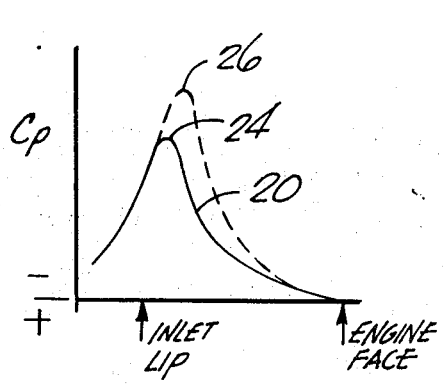
FIG. 2 shows typical pressure distributions for an engine air inlet operating at a high mass ratio

FIG. 2 shows a typical pressure distribution 20 along the inlet 10 operating at high mass ratio, that is, with the engine 14 operating in the region of maximum thrust in a stationary or slow speed condition with respect to the surrounding air. When the inlet lip 16 is subjected to wind velocities other than those aligned with the center line 22 of the inlet 10 and/or flow blockage due to other bodies, the magnitude of the peak negative pressure coefficient 24 increases as shown by the dashed line 26 due to higher local velocities around the lip 16. If the gradient of the pressure distribution 26 becomes great enough, the boundary layer separates from the inner surface 28 of the air inlet 10 causing local flow distortion at the engine face 18. This causes a loss in engine thrust and can cause abnormal engine operation including engine flame out.

Figure 3:
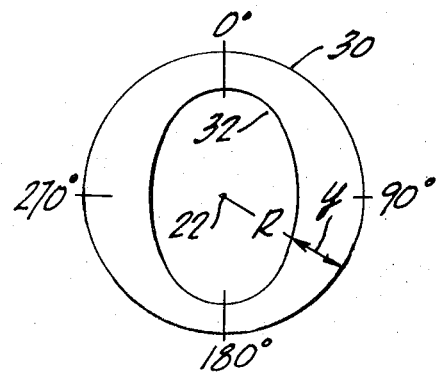
FIG. 3 is a geometric diagram showing the relationship of the lip thickness ($y$) to the air inlet highlight radius ($R$)

It is well known that air inlets 10 can be made less sensitive to adverse conditions by increasing the lip thickness ratio y/R of the inlet lip 16 where R is the distance between the center line 22 of the air inlet 10 and the forwardmost portion or highlight 30 at the point of interest on the periphery of the air inlet 10 and y is the distance between a tangent to the inner surface 28 and a parallel to the center line 22 which passes through the highlight 30 as shown in FIGS. 1 and 3. The tangent touches the inner surface 28 at the throat 32 of the inlet 10.

Heretofore, the lip thickness ratio y/R of generally circular inlets having a highlight 30 lying generally in a plane for pylon mounted jet engines has been held a constant value about the periphery of the inlet 10 while air inlets 10 constructed according to the present invention have distributed lip thickness ratios. The minimum lip thickness ratio is determined from the operating characteristics of the associated engine at rated power and with static conditions. The lip thickness ratio is then increased only in those areas around the periphery of the air inlet 10 where flow separation is likely to occur due to predictable unfavorable flow conditions. In general this is on the bottom, or about the 180° location of the inlet 10 for operation at high angles of attack, on the sides about the 90° and 270° locations for operation while the airplane is yawing or side slipping or for ground operation with a crosswind, and in areas about the periphery where the presence of other bodies such as the wing or the fuselage can contribute to higher local velocities than if the inlet 10 was isolated.

Figure 4:
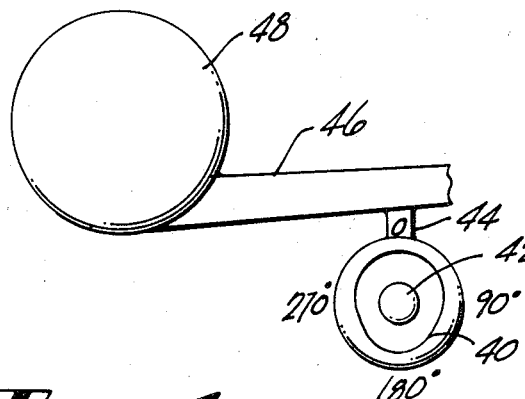
FIG. 4 is a representation of a low wing aircraft with an engine and generally circular air inlet therefor conventionally mounted on a pylon below the wing.
Figure 5:
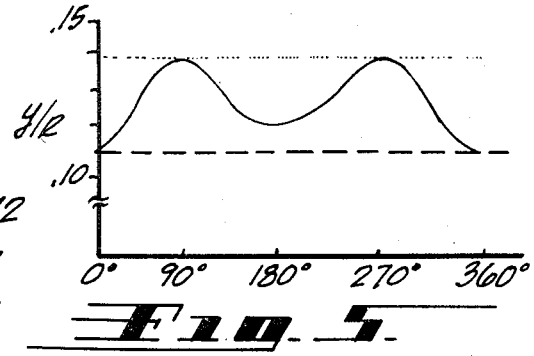
FIG. 5 is a diagram of typical lip thickness ratio distribution for the inlet of FIG. 4.

FIG. 4 shows a typical generally circular inlet 40 for a jet engine 42 mounted on a pylon 44 below the wing 46 of an aircraft 48. As can be seen from the solid line of FIG. 5, which is a plot of the lip thickness ratio versus the angle around the periphery of the inlet 40, the lip thickness ratio is increased at the 90° and 270° locations to protect the inlet 40 against yaw or crosswind conditions and is slightly increased at the 180° portion to protect the inlet 40 during high angle of attack operation. The dashed line indicates the lip thickness ratio required for static operation with no crossflows present while the dotted line indicates the lip thickness ratio that would heretofore have been required on an inlet having a constant lip thickess ratio. The reduced area covered by the solid line with respect to the dotted line is an indication of the decreased drag and weight which is possible with inlets constructed according to the present invention.

Figure 6:
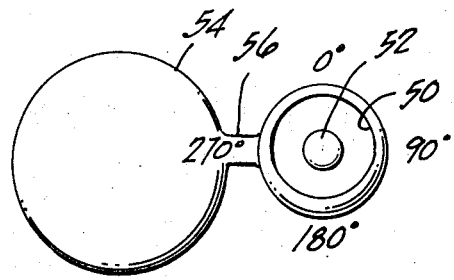
FIG. 6 is a representation of an aircraft having an air inlet and engine pylon mounted to the fuselage side.
Figure 7:
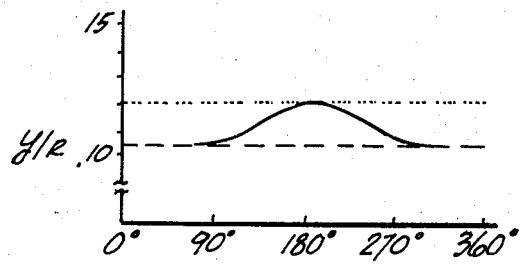
FIG. 7 is a diagram of the typical lip thickness ratio distribution for the inlet of FIG. 6.
Figure 8:
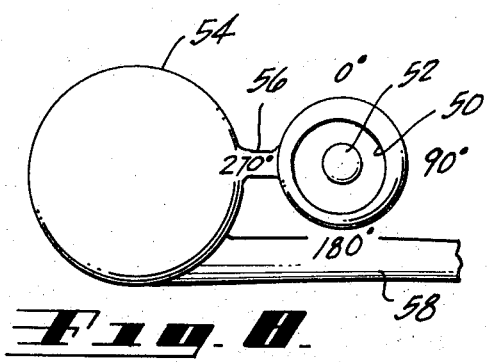
FIG. 8 is a representation of an aircraft having an air inlet and engine pylon mounted to the fuselage side in the presence of the wing.
Figure 9:
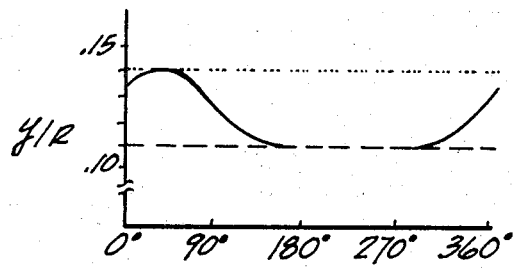
FIG. 9 is a diagram of the typical lip thickness ratio distribution for the air inlet of FIG. 8.

FIG. 6 shows an air inlet 50 in association with a jet engine 52 mounted to an aircraft fuselage side 54 by means of a pylon 56. Such inlets 50 need be protected only for angle of attack and therefore as shown by the solid line in FIG. 7, the lip thickness ratio increase over the minimum ratio shown by the dashed line is only required between the 90° and 270° peripherical positions. When an engine 52 and inlet 50 such as shown in FIG. 6 are positioned in the presence of a wing 58 such as shown in FIG. 8, protection must be provided to counteract the increased velocities from 0° to 90° due to fuselage and wing blockage of the flow adjacent to the 180° to 270° portions thereof. Therefore, as shown in solid line in FIG. 9, the lip thickness ratio is increased over the minimum ratio shown by the dashed line in just about the opposite manner than when such an inlet engine combination is mounted outside the influence of the wing 58.

Figure 10:
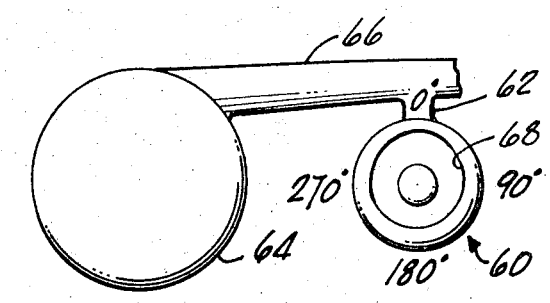
FIG. 10 is a representation of a STOL aircraft having a shoulder or high wing configuration wherein the engine and air inlet are mounted on a pylon below the wing.
Figure 11:
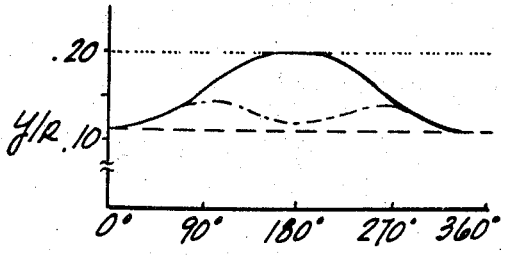
FIG. 11 is a diagram of typical lip thickness ratio distribution for the air inlet of FIG. 10.

FIG. 10 shows an inlet engine combination 60, mounted by a pylon 62 to an aircraft 64 having a shoulder mounted wing 66 such as STOL aircraft. Since STOL aircraft must operate reliably at extremely high angles of attack, the lip thickness ratio around the 180° point about the periphery of the inlet 68 is much greater than the lip thickness ratio shown in any of the other figures. This is shown by the solid line of FIG. 11. For comparison the lip thickness ratio of the similarly mounted inlet 40 of FIG. 4 is shown in dotted and dashed line on FIG. 11 to illustrate the changes that are necessary in the lip thickness ratio whn it is determined that the aircraft will operate at much more adverse conditions. As can be seen in FIG. 11, the average lip thickness ratio is greatly increased over that required for more conventional aircraft, however, the average lip thickness ratio is substantially less than would be required if a constant lip thickness ratio was used about the periphery of the inlet, as shown by the dotted line.

Figure 12:
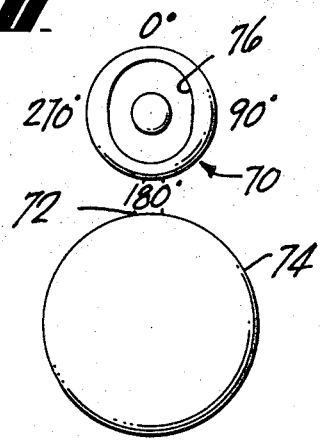
FIG. 12 is a representation of an aircraft having an engine and an air inlet fin mounted on top of the aircraft fuselage.
Figure 13:
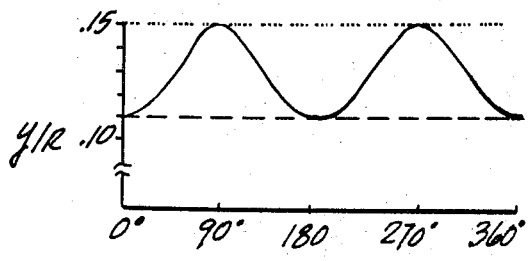
FIG. 13 is a diagram of the typical lip thickness ratio distribution for the inlet of FIG. 12.

FIG. 12 shows a case where an inlet engine combination 70 is mounted by means of a pylon or fin 72 above the fuselage 74 of the aircraft. As shown in FIG. 13 the lip thickness ratio of such an inlet 76 must be increased about the 90° and 270° peripherial positions while a minimal lip thickness ratio is used at the 0° and 180° positions. This is because such an inlet 76 is relatively insensitive to angle of attack due to the flow straightening effect of the adjacent fuselage 74 but it is highly susceptible to crosswinds due to interference effects caused by the fuselage and the fact that winds tend to increase in velocity as the distance away from the ground is increased and such top fuselage mounted inlets 76 are usually substantially further away from the ground that inlets mounted to the aircraft in other positions.

Thus there has been shown and described novel generally circular air inlets for pylon or fin mounted aircraft jet engines which fulfill all of the objects and advantages sought therefor. Many changes, alterations, modifications and other uses and applications of the subject air inlets will become apparent to those skilled in the art after considering this specification and the accompanying drawings. All such changes, modifications, variations, and other uses and applications which do not depart from the spirit and scope of the invention are deemed to be covered by the invention which is limited only by the claims which follow.

What is claim is:

1. A generally cylindrical air inlet for ducting air to a subsonic aircraft's forward facing jet engine, said inlet including:

a generally ring shaped highlight;

a generally circular throat portion defining a minimum cross-sectional area of said inlet; and a smoothly curved inner air inlet surface which extends from said highlight to said throat portion, said surface defining the center line of said inlet centered therein, the distance from said center line to said highlight defining R at any point about the periphery of said highlight and the distance between a tangent to said inner surface at said throat and a parallel to said center line passing through said highlight defining y, said inlet being constructed so the ratio $y/R$ varies in a predetermined manner about the periphery of said inlet to prevent airflow separation during adverse operating conditions, said variation in a predetermined manner being so the ratio $y/R$ is larger at radial segments of said air inlet subjected to the greatest relative wind angles to said center line than at radial segments of said air inlet subjected to lesser relative wind angles.

2. The air inlet defined in claim 1 wherein the uppermost portion of said air inlet in its normal orientation, is defined as the 0°–360° point thereof and the point thereof 90° from the 0°–360° point toward the centerline of the aircraft is defined as the 270 point thereof, said ratio $y/R$ being minimum about the 0°–360° point, and maximum about the 90° and 270° points.

3. The air inlet defined in Claim 2 wherein said ratio $y/R$ is greater at the 90° and 270° points than at the 0°–360° point and said ratio $y/R$ is maximum at the 180° point.

4. The air inlet defined in claim 2 wherein said ratio $y/R$ is greater at the 180° point than at the 0°–360° point and said ratio $y/R$ is greater at the 90° and 270° points than at the 180° point.

5. The air inlet defined in claim 1 wherein said air inlet is spaced from and mounted to the side of the aircraft fuselage, the uppermost portion of said air inlet in its normal orientation being defined as the 0°–360° point thereof and the point thereof 90° from the 0°–360° point toward the centerline of the fuselage being defined as the 270° point thereof, said ratio $y/R$ being minimum on the upper portion of said inlet generally between the 270° to 90° points and maximum about the 180° point.

6. The air inlet defined in claim 1 wherein said air inlet is spaced from and mounted to the side of the aircraft fuselage, the uppermost portion of said air inlet in its normal orientation being defined as the 0°–360° point thereof and the point thereof 90° from the 0°–360° point toward the centerline of the fuselage being defined as the 270° point thereof, said ratio $y/R$ being maximum between the 0°–360° and 90° points and minimum between the 180° and 270° points.

7. The air inlet defined in claim 1 wherein said air inlet is spaced from and mounted above the aircraft fuselage, the uppermost portion of said air inlet being defined as the 0°–360° point, said ratio $y/R$ being minimum at the 0°–360° and 180° points and being maximum at the 90° and 270° points.

8. The air inlet defined in claim 1 wherein said ratio varies at least 0.01.

9. The air inlet defined in claim 1 wherein said lip thickness ratio is greater than a predetermined minimum thickness at the lower portion of said inlet to protect against separation due to a positive angle of attack of the aircraft.

10. The air inlet defined in claim 1 wherein said lip thickness ratio is greater than a predetermined mimimum thickness at the sides thereof to protect against separation due to crosswinds.

* * * * *

PO-1050
(5/69)

UNITED STATES PATENT OFFICE
CERTIFICATE OF CORRECTION

Patent No. 3,765,623   Dated 16 Oct 1973

Inventor(s)   John E. Donelson  -  William M. Douglass

It is certified that error appears in the above-identified patent and that said Letters Patent are hereby corrected as shown below:

Inventors - "Douglas" should be --Douglass--

Col. 2, line 16, after "ratio" should be a semicolon --;--.

Col. 4, line 16, "whn" should be --when--, line 38, "that" should be --than--.

Claim 1, line 4, after "highlight" --lying generally in a plane-- should follow.

Claim 2, line 5, "270" should be --270°--.

Signed and sealed this 4th day of June 1974.

(SEAL)
Attest:

EDWARD M. FLETCHER, JR.
Attesting Officer

C. MARSHALL DANN
Commissioner of Patents